United States Patent Office 3,527,842
Patented Sept. 8, 1970

3,527,842
PRESSURE SENSITIVE ADHESIVE MADE
FROM SILOXANE RESINS
Harold A. Clark, Midland, Mich., assignor to Dow Corning Corporation, Midland, Mich., a corporation of Michigan
No Drawing. Filed Apr. 14, 1969, Ser. No. 816,093
Int. Cl. C08g 47/04
U.S. Cl. 260—825    4 Claims

ABSTRACT OF THE DISCLOSURE

Mixture of a polysiloxane resin (1) which contains SiOH groups and has a phenyl to silicon ratio of from 0.5 to 0.8, (2) a phenylvinylsiloxane resin having a vinyl to silicon ratio of 0.15 to 0.60 and (3) a SiH containing siloxane compatible with (1) and (2) can be partially cured by action of a catalyst causing addition of the SiH to the silicon-vinyl to give a pressure-sensitive adhesive. This adhesive is useful for bonding films such as polyimide films to metal substrates, such as electrical conductors. After bonding the film to the substrate the assembly is heated to cure (1) and permanently bond the film to the substrate.

---

Pressure-sensitive adhesives comprising combinations of dimethylsiloxane polymers and a methylsiloxane resin are disclosed in U.S. Pat. 2,736,721. These materials are excellent for use in bonding many substrates together. However, such methylpolysiloxanes do not have the same order of thermal stability of certain organic polymers, such as polytetrafluoroethylene or aromatic polyimides. As a result these adhesives are not useful as bonding agents for aromatic polyimide films to metal surfaces when the assembly is to be exposed to high temperature for long periods of time. The methylpolysiloxane resin will deteriorate long before the polyimide film, and thus, for example, severely limit the useful life of electrical insulation wherein the insulating film is an aromatic polyimide.[1]

Phenylpolysiloxane resins are the most thermally stable of all organopolysiloxanes presently known. The thermal stability of such resins approaches that of aromatic polyimide films. However, these resins have not been suitable heretofore for the production of pressure sensitive adhesives to bond aromatic polyimide film to substrates. The reason for this is that polyimide films, although flexible, are quite stiff. Therefore, when an adhesive is used to bond these films to a substrate, such as an electric conductor, the film has a tendency to pull away from the conductor. With presently known phenylpolysiloxane resins the materials are sticky in the uncured state. However, when they are heated the sticky material becomes quite fluid and loses its cohesiveness. Thus, the springy polyimide tape pulls away from the conductor before the resin gels. Thus, it is impossible to employ such resins because voids are left in the insulation and as is well known, voids in electrical insulation give rise to corona.

It is known from Canadian Pat. 584,278 that certain phenylsiloxane resins containing significant amounts of diphenylsiloxane will cure at room temperature to form a bond between substrates. However, the curing at room temperature requires several hours as shown by said patent, and in the production of coils it is not practical to wait several hours for the adhesive to cure before proceeding with the fabrication of the coil. Furthermore, the adhesive shown in such Canadian patent will not operate as a pressure sensitive adhesive because once the material cures it is tack-free. If a backing material is coated with a solution of the resin and the tape is applied to the base member before the solvent evaporates there is no way for the solvent to escape through the solid backing material. Thus, voids will form in the coil.

It is the object of this invention to produce a pressure-sensitive adhesive which can be used to bond films to substrates and which can hold said films in place during fabrication of electric coils and during high temperature operation thereafter.

This invention relates to a composition consisting essentially of (1) a methylphenylpolysiloxane resin having an average of from 1.45 to 1.8 methyl and phenyl groups per silicon atom and a phenyl to silicon ratio of from 0.5 to 0.8, said resins containing silicon-bonded hydroxyl groups, (2) a polysiloxane containing from .15 to .60 vinyl radicals per silicon atom, said polysiloxane having on the average of at least 8 silicon atoms per molecule, a phenyl to silicon ratio from .25:1 to 1.75:1 and having on the average of at least one hydrocarbon group per silicon atom attached to the silicon by silicon carbon bond, the hydrocarbon groups in said polysiloxane being methyl, phenyl, or vinyl radicals, (3) a siloxane compatible with (1) and (2) having at least 2 SiH groups per molecule on the average, the remaining valences of the silicon atoms in said siloxane (3) being essentially all satisfied with aryl hydrocarbon and methyl radicals and SiOSi linkages, (3) being present in amount sufficient to gel (2) and (4) a catalyst for promoting the reaction of (2) and (3), the proportion of (2) being from 5 to 50% by weight of the weight of (1).

The compositions of this invention are made and employed by mixing (1), (2) and (3) in any convenient manner, either with or without a solvent and adding (4) a catalyst for promoting the reaction of (2) and (3). That is, the catalyst should promote the addition of the SiH to the Si vinyl so that gels formed thereby constitute a partially-cured mixture. This mixture is a pressure-sensitive adhesive[2] material. It is in a condition where it causes the adherence of a film on which it has been coated to any substrate to which the film is applied. The assembly can then be heated further to cure resin (1).

If desired, a suitable catalyst can be included in (1) such as metal salts of carboxylic acids or amines which promote the condensation of silicon-bonded hydroxyl groups. However, such catalysts are optional since (1) can be cured merely by heating.

Resin (1) when fully cured forms a permanent bond between the film and the substrate. This bond is quite thermally stable and has a life approaching that of aromatic polyimide resins, or if employed with metal films will extend the useful life of the laminate far beyond that of any other organosilicon compound.

This invention also relates to an article of manufacture comprising a flexible backing material coated at least on one side with a pressure-sensitive adhesive consisting essentially of a mixture of (1) shown above and a gelled mixture of (2) and (3).

The catalyst suitable for gelling mixtures of (2) and (3) is any catalyst which will promote the addition of SiH groups to Si vinyl. These include such well known catalysts as peroxide or platinum catalysts such as chloroplatinic acid, platinum on charcoal or various platinum complexes with olefins. Other metal catalysts such as palladium and rubidium can be employed but the efficiency of such materials is not as good as that of platinum.

---

[1] Such as films made from copolymers of trimellitic anhydride and p,p'-aminodiphenylether.

[2] A "pressure sensitive" adhesive can be removed from the surface to which it has been applied and later reapplied without substantial loss of adhesion. A "permanent bond" adhesive is one which fully cures in place and cannot thereafter be removed from the surface to which it is adhered and then reapplied.

Resin (1) employed in this invention can be any methylphenylpolysiloxane having an average of 1.45 to 1.8 methyl and phenyl groups per silicon and a phenyl to silicon ratio in the range of .5 to .8. Such resins are well known commercial items and can be copolymers of any combination of monomethylsiloxane, dimethylsiloxane, phenylmethylsiloxane, diphenylsiloxane and monophenylsiloxane falling within the above ranges. As is well known such copolymers normally contain silicon-bonded hydroxyl groups through which the resin is finally cured. The amount of SiOH is not critical. As is well known the percent by weight SiOH in commercial phenylsiloxane resins ranges from .05 to 5%.

Phenylvinylsiloxane resins suitable for ingredient (2) are shown in U.S. Pat. 2,915,497. Thes polysiloxanes must have from 15 to 60 mol percent vinylsiloxane units. The term vinylsiloxane unit includes any siloxane unit having at least one vinyl group attached to the silicon. In addition, the siloxane contains at least .25 to 1.75 phenyl radicals per silicon atom. Within these limits the siloxane can consist of any copolymer of the following siloxane units arranged in any proportion which do not exceed the limits stated. These units are, for example, monovinylsiloxane, divinylsiloxane, phenylvinylsiloxane, methylvinylsiloxane, trivinylsiloxane, divinylmethylsiloxane, divinylphenylsiloxane, monovinyldimethylsiloxane, monovinyldiphenylsiloxane, monovinylphenylmethylsiloxane, monomethylsiloxane, dimethylsiloxane, monophenylsiloxane, diphenylsiloxane, phenylmethylsiloxane, trimethylsiloxane, dimethylphenylsiloxane, methyldiphenylsiloxane, triphenylsiloxane and $SiO_2$ units.

Cross-linker (3) for resin (2) can be any siloxane having at least two SiH groups per molecule on the average which is compatible with (1) and (2). In general, the presence of phenyl groups or other aryl groups in (3) is necessary in order to insure compatability with (1) and (2). However, the presence of phenyl groups are not critical with respect to operativeness so long as compatability is obtained. (3) can be of any configuration such as linear, branched or cyclic in structure. Specific examples of siloxanes which are operative for (3) are $Me_2HSiOSiPhMeH$, $MePh_2SiOSiMeH_2$

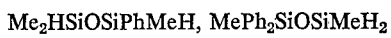

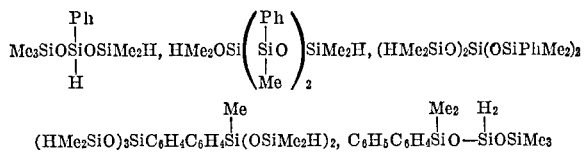

dimethyldiphenyl cyclotetrasiloxane and tetramethyldiphenyl-cyclotetrasiloxane.

For the purpose of this invention the viscosity of (3) is not critical and (3) can be of any molecular weight. The amount of (3) is not critical so long as there is enough to gel (2).

The mitxures of (1), (2), (3) and (4) can be applied to the backing material in any convenient manner. If the mixture is fluid it can be applied per se, but oftentimes it is convenient to dissolve the mixture in a suitable solvent and thereafter apply it to the backing material and allow the solvent to evaporate. The coated material is then heated to a temperature sufficient to cause the catalyst to cross-link (2) and (3), thereby forming a sticky pressure sensitive material. The temperautre is not critical and can be varied with the time of cure. For the production of pressure sensitive tapes it is advantageous to cure at high speeds in order to increase production. If allowed to stand (2) and (3) will gel at room temperature but this may take several days or weeks.

The material can be applied to any backing such as those of metal, ceramic, organic plastic; or natural substrates such as cellulose and the like.

The following examples are illustrative only and should not be construed as limiting the invention which is properly delineated in the appended claims. In this application Me represents the methyl radical, Ph the phenyl radical and Vi the vinyl radical.

EXAMPLE 1

Resin (1) employed in this example contains silicon-bonded hydroxyl groups and was a copolymer of 50 mol percent phenylmethylsiloxane, 15 mol percent monophenylsiloxane, 25 mol percent monomethylsiloxane, and 10 mol percent diphenylsiloxane. (1) contained .6% zinc octoate catalyst.

Resin (2) employed in this example was a phenylmethylvinylsiloxy-endblocked copolymer of 60 mol percent phenylmethylsiloxane and 40 mol percent phenylvinylsiloxane.

Formulation I was made by mixing a 50% toluene solution of (1) above containing 25 parts by weight of (1) with 3.6 parts by weight (2) and 1.4 parts by weight of (3) a copolymer of 50 mol percent phenylmethylsiloxane and 50 mol percent methyl hydrogen siloxane. This formulation was catalyzed with three drops of a xylene dispersion containing .2% by weight chloroplatinic acid.

Formulation II was 25 parts by weight (1), 3.9 parts by weight (2) and 1.05 parts by weight (3) of symmetrical diphenyldimethyldisiloxane. This formulation was catalyzed with three drops of the above chloroplatinic acid dispersion.

Formulation III was 25 parts by weight (1), 4 parts by weight (2) and 1 part by weight (3) of

This formulation was catalyzed with 15 drops of the above chloroplatinic acid dispersion.

Each of the above formulations was applied to a two-mil thick aromatic polyimide tape sold under the trade name Kapton® and the solvent was allowed to evaporate. The tape was then heated in each case 3 minutes at 170° C. this produced a pressure-sensitive adhesive on the tape. The polyimide tape was then bonded by means of the adhesive to copper and the resulting laminate was heated two hours at 260° C. The bond strength after this heating schedule was as follows:

(I) 0.6 pound per inch
(II) 1.2 pounds per inch
(III) 1.25 pounds per inch.

The bond strength was measured by pulling the tape at an angle of 180° relative to the copper on a Scott tester at a rate of 2 inches per minute. Each of the assemblies was then heated 72 hours at 260° C. At the end of this time each of the assemblies had a bond strength of .6 pound per inch as measured by the Scott tester. This shows the good thermal stability of the adhesive.

EXAMPLE 2

75 parts by weight of resin (1) of Example 1, 17.8 parts by weight of resin (2) of Example 1, and 7.2 parts by weight of a copolymer of 50 mol percent of phenylmethylsiloxane and 50 mol percent of methyl hydrogen siloxane were mixed with 3 drops of the chloroplatinic acid dispersion of Example 1. The mixture was applied to Kapton tape and heated 4 minutes at 170° C. The tape was then bonded to copper to get a secure bond and the laminate was heated for 2 hours at 260° C. The ultimate bond was .6 pound per inch as measured by the Scott tester.

EXAMPLE 3

50 g. of resin (1) of Example 1 was mixed with 8 g. of resin (2) of Example 1, and 2 g. of $PhSi(OSiMe_2H)_3$ and then catalyzed with 15 drops of the catalyst of Example 1.

The mixture was applied to Kapton tape and heated 3 minutes at 170° C. and the tape was then bonded to aluminum. The assembly was then heated for 2 hours at 260° C. whereupon the bond between the polyimide and the aluminum was 1.2 pounds per inch. The assembly was then heated 7 days at 260° C. and a firm bond between the polyimide film and aluminum was maintained.

EXAMPLE 4

Equivalent results are obtained when the following are substituted for (1), (2) and (3) respectively in formulation I of Example 1. Each (1) contains SiOH.

| Mol percent | | |
| --- | --- | --- |
| (1) | (2) | (3) |
| Copolymer of:<br>19% MeSiO$_{3/2}$<br>42% Me$_2$SiO<br>10% PhSiO$_{3/2}$<br>29% Ph$_2$SiO | Copolymer of:<br>33% ViSiO$_{3/2}$<br>33% PhSiO$_{3/2}$<br>17% PhViSiO<br>17% PhMeSiO | Me$_3$SiO(SiO)$_6$SiMe$_3$<br>　　　　　│<br>　　　　　Ph<br>　　　　　│<br>　　　　　H |
| Copolymer of:<br>24.8% MeSiO$_{3/2}$<br>9.8% Me$_2$SiO<br>29.8% PhSiO$_{3/2}$<br>35.6% PhMeSiO | Copolymer of:<br>45% MeViSiO<br>45% PhSiO$_{3/2}$<br>10% Me$_2$SiO | PhMeHSiC$_6$H$_4$C$_6$H$_4$SiMe$_2$H |
| Copolymer of:<br>15% MeSiO$_{3/2}$<br>35% PhSiO$_{3/2}$<br>40% Me$_2$SiO<br>10% Ph$_2$SiO | Copolymer of:<br>50% Ph$_2$SiO<br>50% PhViSiO | Si(OSiPhMeH)$_4$ |
| Copolymer of:<br>50% PhMeSiO<br>20% Me$_2$SiO<br>15% PhSiO$_{3/2}$<br>15% MeSiO$_{3/2}$ | Copolymer of:<br>50% PhSiO$_{3/2}$<br>50% ViSiO$_{3/2}$ | C$_6$H$_5$C$_6$H$_4$Si(OSiMe$_2$H)$_3$ |

That which is claimed is:
1. A composition consisting essentially of
   (1) a methylphenylpolysiloxane resin having from 1.45 to 1.8 total phenyl and methyl groups per silicon atom and a phenyl to silicon ratio of 0.5 to 0.8, said resin containing silicon-bonded hydroxyl groups,
   (2) a polysiloxane containing from .15 to .60 vinyl radicals per silicon, said polysiloxane having an average of at least 8 silicon atoms per molecule, a phenyl to silicon ratio from .25:1 to 1.75:1 and having on the average of at least one hydrocarbon group per silicon atom, the hydrocarbon groups in said polysiloxane being phenyl, methyl or vinyl radicals,
   (3) a siloxane compatible with (1) and (2) having at least 2 SiH groups per molecule on the average, the remaining valences of the silicon being essentially all satisfied with aryl hydrocarbon radicals, methyl radicals and SiOSi groups, (3) being present in amount sufficient to gel (2) and
   (4) a catalyst for promoting the reaction of (2) and (3), the proportion of (2) being from 5 to 50% by weight of the weight of (1).

2. The composition of claim 1 in which (1) is a copolymer of phenylmethylsiloxane, monophenylsiloxane, monomethylsiloxane and diphenylsiloxane, and (2) is a copolymer of phenylmethylsiloxane and phenylvinylsiloxane.

3. An article of manufacture comprising a flexible backing material coated on at least one side with a pressure-sensitive adhesive consisting essentially of a mixture of an essentially uncured siloxane resin (1) of claim 1 and a gelled siloxane resin (2) of claim 1, said resin having been gelled by the interaction of (2) and (3) of claim 1, the proportion of (2) being from 5 to 50% by weight of the weight of (1).

4. The article of claim 3 in which the flexible backing material is an aromatic polyimide film.

References Cited

UNITED STATES PATENTS 2,934,464　4/1960　Hoffman et al. _____ 260—825
3,284,406　11/1966　Nelson _____ 260—825

SAMUEL H. BLECH, Primary Examiner

U.S. Cl. X.R.

117—123, 132, 138.8, 143, 232; 161—207